March 19, 1935.　　　　E. WOLTMANN　　　　1,994,554
ELECTRIC WELDING DEVICE
Filed Feb. 3, 1933　　　2 Sheets-Sheet 1
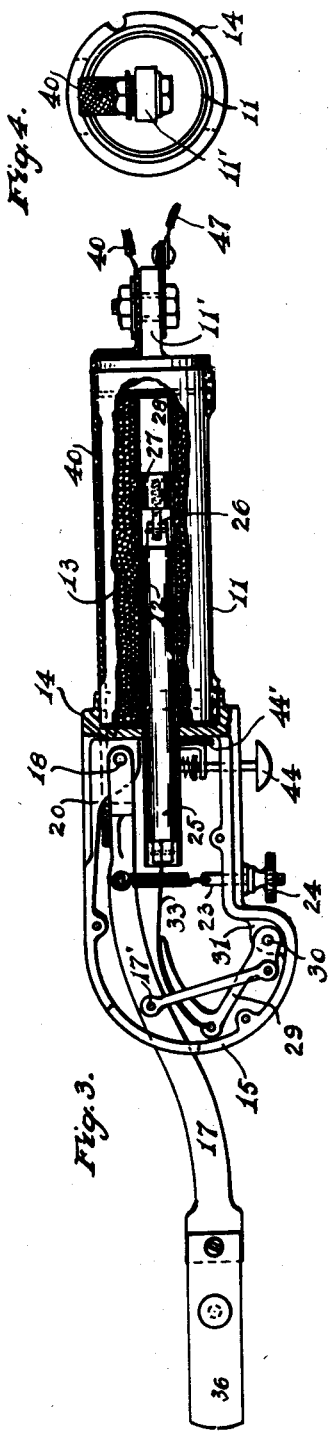
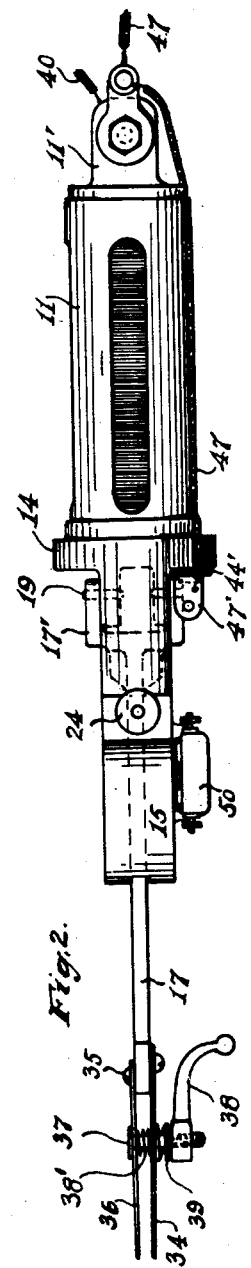
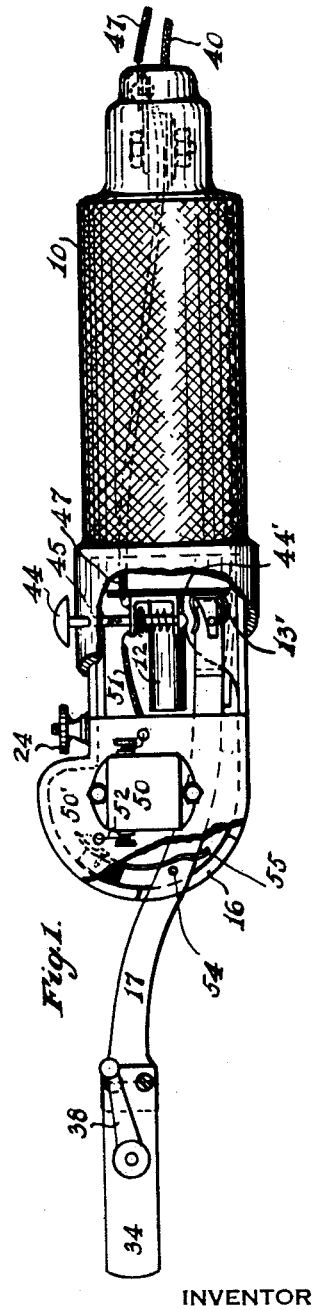
INVENTOR
*Ernst Woltmann*
BY
*Harold D. Penney* ATTORNEY

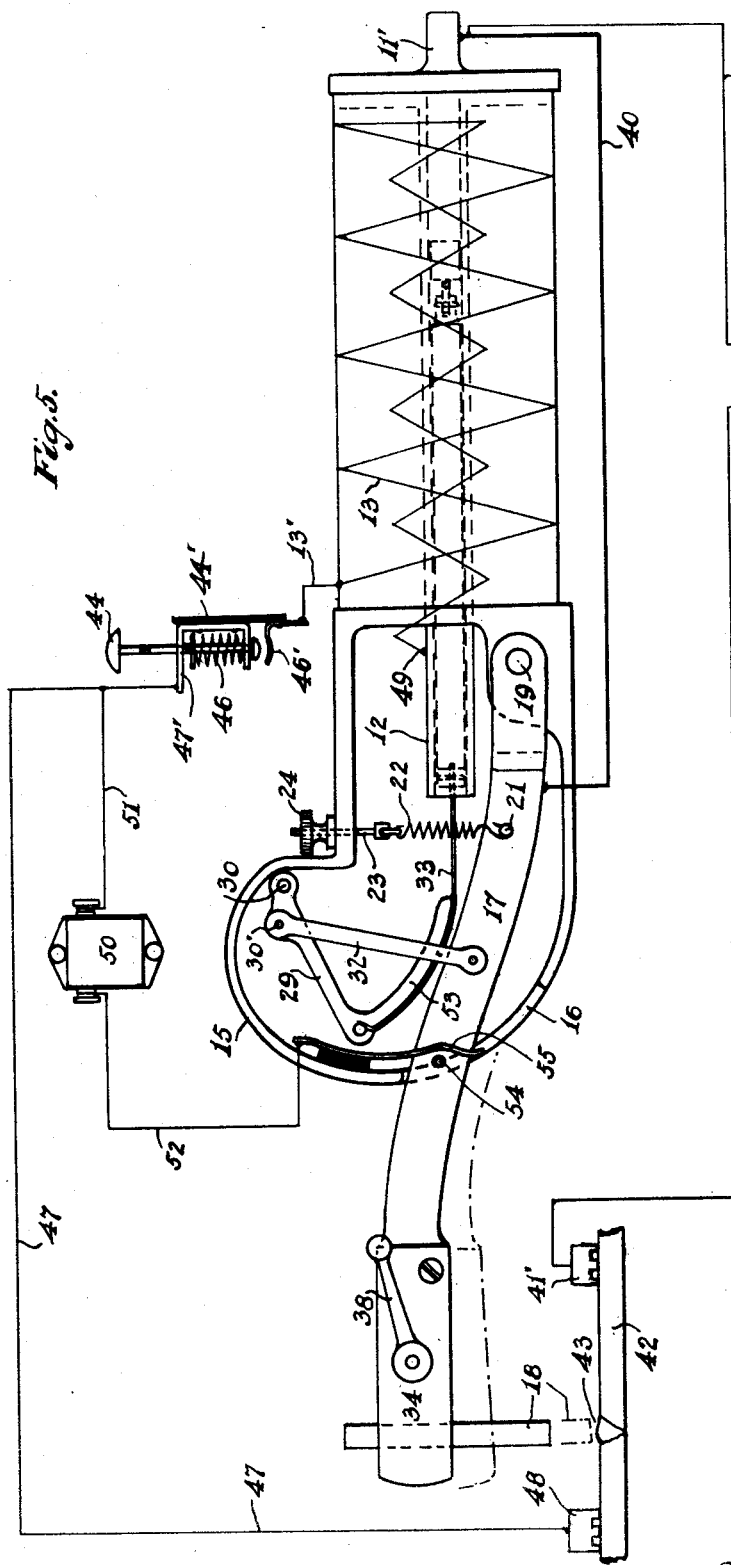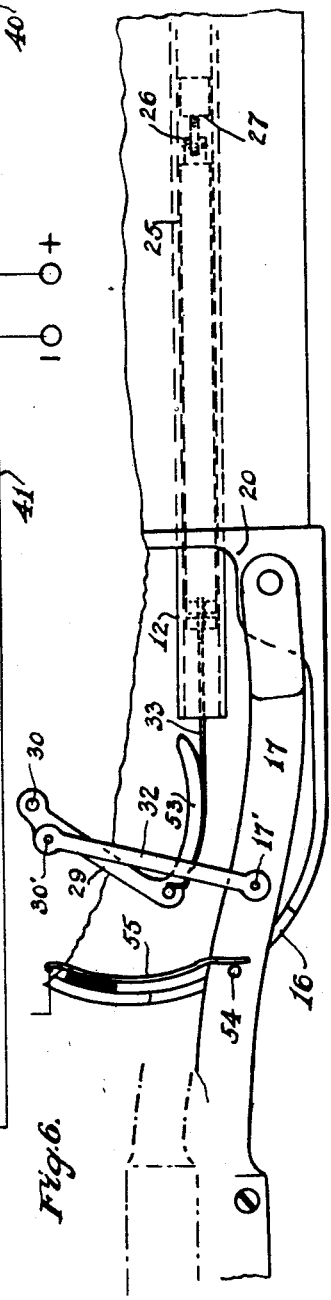

Patented Mar. 19, 1935

1,994,554

UNITED STATES PATENT OFFICE 1,994,554

ELECTRIC WELDING DEVICE

Ernst Woltmann, New York, N. Y.

Application February 3, 1933, Serial No. 655,010

2 Claims. (Cl. 219—8)

This invention relates to electric welding devices and has for one of its objects the provision of an organization in which the various elements are so coordinated structurally and functionally as to assure improved results with inexpensive material which is easy to keep in effective working condition.

As devices of this type, which necessarily call for a number of circuits, have heretofore included such a number of structures as rendered the same heavy for hand operation, one of the problems solved by the present invention is that involved in reducing the parts employed so as to render the device easily manipulable.

A feature of the invention is an extension of the manipulable portion, and as this is hollow, while the welding terminal is exteriorly positioned, a movable support for said terminal, as well as control means for the circuits, are partly housed within the extension, this being to secure another object of the invention.

In an electric welding device disclosed in my prior patent, numbered Re. 15,652, and dated July 10, 1923, on which the present case is an improvement, the handle and lever carrying the welding terminal are disposed right angularly.

As the elongate handle is hollow and contains a reciprocable plunger, while the said support is, in this embodiment of the invention, disposed in axial relation with the handle, a further object is the provision of means for reciprocating the support perpendicularly. Said means, as shall hereinafter appear, include an interposed flexible element, which is extensible and contractible axially.

With the above indicated objects in view, the invention resides in a novel construction, which, including certain combinations and arrangements of parts, is herein clearly described, and fully illustrated in the accompanying drawings, in which:

Fig. 1 is a fragmentary lateral elevational view of my improved welding device, some parts being broken away to clearly disclose others.

Fig. 2 is a partial plan view.

Fig. 3 is a fragmentary lateral view of the side of the device opposite that shown in Fig. 1.

Fig. 4 is a partial end elevational view.

Fig. 5 is a diagrammatic view, in which the circuits are shown; and

Fig. 6 is a fragmentary view, like that shown in Fig. 5, but with some of the parts in changed positions.

The welding device includes a hand grip portion 10 of a hollow handle, within which a casing having an outer shell 11 and an inner tube or collar 12 houses a coil of winding 13 of a solenoid.

Embracing the shell 11 by a ring or disc portion 14 is another handle portion or head, which includes a rigid strap 15; and movable in a slot 16 of this strap is a lever 17, which, carrying at one of its ends a welding terminal 18, is pivotally mounted at its opposite end, by forked terminals 17', on like pins 19, which engage a web or portion 20 of said head. Carried on the lever 17 is a pin 21, on which one of the ends of a tension spring 22 finds an anchorage, and as the other end of this spring is connected with one end of a rod 23, said lever is normally retained in the position shown in full lines in Fig. 5, the other end of the rod being held on the structure of the head.

Movement of this lever to the welding position, as shown in dot and dash lines in the said figure, is against the action of the spring 22, and as the rod 23 is terminally threaded, and has mounted thereon a thumb nut 24, the length of the spring is adjustable for varying its tension, said rod being provided with an angular body portion, which is axially movable in the head.

Loosely positioned in the tube 12, for axial movement, is a core or plunger which includes a section 25. Pivotally attached at 26 to the said section is a second section 27, and the fit of this latter section in the tube is such that air is suitably compressible and expansible in a chamber 28 of said tube, for rendering movement of the plunger resilient, but sluggish.

The lever 17 is disposed generally in parallel relation with the axis of the elongate handle and as it is desirable to cause said lever to move perpendicularly during axial plunger movement, these parts are flexibly connected by a novel and compact structure, which includes a second or auxiliary lever 29, also pivoted within the hollow head, this being at 30, on a web or flange 31.

A link 32 is terminally pivotally mounted on said levers, and as a flexible element 33 connects the plunger with the lever 29, this results in the relative axial and perpendicular movements explained, said link being of rigid material. Pivots for the link 32 are shown at 30' and 17'.

A clip or holding device, which carries the welding terminal 18, includes, rigid with the lever 17, an extension 34, and, loosely held on said lever by a screw 35, an arm 36, there being a suitable aperture in the lever for the screw. Carried on the arm 36 is a headed pin 37, which is movable through the arm 34. The terminal of the pin is threaded and has threadedly mounted thereon an arm or crank 38, so that on turning the latter the welding terminal is securely held or released, as desired. The pin 37 is preferably provided with an expansion spring 38', so that the clip may automatically drop the welding terminal, on turning the crank in one direction; and with another spring 39 to render the grip of the crank terminal resilient. A washer, not shown, may be used between the crank and its spring.

Electric current from any source is received through one insulated wire 40 of a cord which also includes a return wire 41, temporarily attached to the work by a contact block 41. The wire 40 is attached to the end portion 11' of the solenoid casing, as shown. From the wire 40 current passes through the lever 17, welding terminal 18, and work piece 42, an arc being established at 43, and back to the source through said wire 41. A circuit control rod or switch 44, which is slidable in an aperture 45 of the handle, is disposed in the solenoid branch circuit.

From one side of the switch structure, which includes a spring 46, the current finds a path across the arc 43, through a wire 47, which is adjustably connected with the work, as at 48. From the other side of the switch current passes through a wire 13' to the coil 13, and thence from the other end 49 of the coil, through the metal of the head of the handle, pivot 19, to connect with the lever 17 of the main circuit, for receiving current through the wire 40. Brackets 47' and 46' of the switch are rigidly mounted on insulating material 44', which is carried on the head of the handle. A buzzer or signalling device 50, carried on a side plate 50' of the head, is connected at one side, through a wire 51, with the wire 47; and at the other side, through a wire 52, with the lever 17. The device may have another plate like that shown at 50'.

To effect economy of space and to facilitate mutual movement of the plunger and the lever 17, through the interposed connections, the lever 29 is provided with an arcuate arm 53; and this arm is effective to augment the action of portion 29, by additionally contracting the flexible element 33, as seen, for instance, in Fig. 5.

On bringing the welding terminal into the full wire position shown in the last mentioned figure, and closing the switch 44, as by a finger of an operator, the solenoid is energized to draw the plunger inwardly and move the terminal to the dot and dash position, thereby forming the arc at 43 and commencing the welding operation. The operator necessarily wears smoked glasses, and cannot properly see the correct length of the arc; but the buzzer is arranged to act as an audible signal and guide.

Downward movement of the lever causes a pin 54 to contact with a strip 55 of the circuit of the buzzer, which causes the latter to give the signal for informing the operator that the bar 18 is correctly positioned. The spring 22 acts against the inward action of the plunger; and, during operation of the device, vibration of the plunger and the lever 17 are further rendered suitably sluggish by compression of air in the chamber 28, hereinbefore referred to.

Since the strip 55 is held on the structure 15, the buzzer circuit becomes broken between 54 and 55, if the bar 18 is drawn too far from the work. This is an advantageous feature; and it is only necessary for the operator to move the said bar slightly nearer to the work, when the arc is again correctly drawn, the buzzer circuit closed, and the welding operation again established.

As the hereinbefore described construction admits of considerable modification, without departing from the invention, the particular arrangements shown should be taken as illustrative, and not is a limiting sense. Therefore, the scope of the invention contemplated is to be taken solely from the appended claims, interpreted as broadly as is consistent with the prior art.

What I claim is:

1. In an electric welding device comprising in combination a lever, and a welding terminal, a holder for said terminal including an extension of said lever, an arm disposed in parallel relation with said extension, fastening means loosely holding said arm on the lever, a pin carried by said arm and slidably mounted in said extension, there being in the latter an aperture, said pin having a threaded terminal, and manipulatable means turnably mounted on said terminal for sliding said pin to draw said arm towards said extension for holding a welding terminal, and springs on said pin between said extension and manipulating means respectively and the arm.

2. In a welding device, a pair of spring arms; an adjusting bolt passing through the arms and carrying a nut; a spring between the arms to hold the arms apart; and a spring between the nut and an arm to oppose the first named spring; adjustment of the nut adjusting the normal distance between the arms when no electrode is therebetween, to facilitate easy insertion, with a single hand, of assorted sizes of electrodes.

ERNST WOLTMANN.